(12) United States Patent
Tang et al.

(10) Patent No.: US 10,489,474 B1
(45) Date of Patent: Nov. 26, 2019

(54) TECHNIQUES TO LEVERAGE MACHINE LEARNING FOR SEARCH ENGINE OPTIMIZATION

(71) Applicant: Capital One Services, LLC, McLean, VA (US)

(72) Inventors: Qiaochu Tang, The Colony, TX (US); Stephen Wylie, Carrollton, TX (US); Jason Hoover, Grapevine, TX (US); Avid Ghamsari, Frisco, TX (US); Micah Price, Plano, TX (US); Geoffrey Dagley, McKinney, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/400,004

(22) Filed: Apr. 30, 2019

(51) Int. Cl.
*G06F 16/00* (2019.01)
*G06F 16/9538* (2019.01)
*G06F 17/27* (2006.01)
*G06N 20/00* (2019.01)

(52) U.S. Cl.
CPC .......... *G06F 16/9538* (2019.01); *G06F 17/27* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 7,979,386 B1* | 7/2011 | Sholtis | G06Q 30/02 707/603 |
| 2003/0217052 A1* | 11/2003 | Rubenczyk | G06F 16/3323 |
| 2009/0299978 A1* | 12/2009 | Farfurnik | G06F 16/951 |
| 2013/0290905 A1 | 10/2013 | LuVogt et al. | |
| 2015/0088846 A1* | 3/2015 | Roe | G06F 16/958 707/706 |
| 2015/0100943 A1 | 4/2015 | Gabel et al. | |
| 2016/0171549 A1* | 6/2016 | Rozental | G06F 16/951 705/14.6 |
| 2018/0349514 A1 | 12/2018 | Alzate Perez et al. | |
| 2019/0026815 A1 | 1/2019 | Zhou et al. | |

OTHER PUBLICATIONS

Cer, et al., "Universal Sentence Encoder for English", Proceedings of the 2018 Conference on Empirical Methods in Natural Language Processing (System Demonstrations) Brussels, Belgium [online], Oct. 31-Nov. 4, 2018, [retrieved on Jan. 22, 2019]. Retrieved from Internet URL: http://aclweb.org/anthology/D18-2029, pp. 169-174 ©2018 Association for Computational Linguistics.

* cited by examiner

*Primary Examiner* — Son T Hoang

(57) ABSTRACT

Techniques to leverage machine learning for search engine optimization (SEO). Some techniques are applicable to turnkey e-commerce solutions operating on the Internet as an online platform. These techniques use machine learning to gain insights into patterns/relationships between search terms and items for sale on the online platform. Depending on a relevancy or an accuracy of a search term to a particular item for sale, the online platform inserts the search term into the online platform such that a public search engine crawler increases a search engine result position for the online platform. Other embodiments are described and claimed.

20 Claims, 9 Drawing Sheets

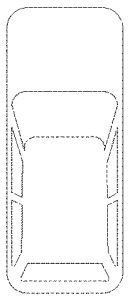
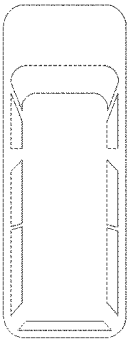
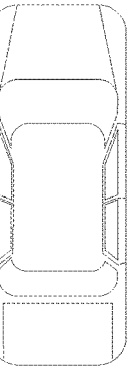
*Platform Search Data 300*
| COMPACT CAR | MINIVAN | FULL-SIZE PICKUP | FULL-SIZE CAR |
|---|---|---|---|
| -TECH-READY<br>-GOOD FOR ENVIRONMENT<br>-ECONOMICAL | -TECH-READY<br>-KID-FRIENDLY<br>-FAMILY-FRIENDLY<br>-SOCCER MOM VEHICLE | -COAL RUNNER<br>-ROUGH AND TOUGH | -GAS GUZZLER<br>-FAST AND FURIOUS |
*FIG. 3A*

US 10,489,474 B1

TECHNIQUES TO LEVERAGE MACHINE LEARNING FOR SEARCH ENGINE OPTIMIZATION

BACKGROUND

Consumerism, although constantly evolving, has been (throughout history) behind many of the important transformations in everyday life. Fewer people frequent brick-and-mortar establishments than in previous years and, at present time, many consumers look to technology to satisfy their needs and wants. A growing number of people engage in commerce over the Internet and/or via mobile applications, ultimately transitioning shopping from a physical experience to a digital one. Companies who wish to survive given this transition must invest in technology capable of providing an online/digital shopping experience or, otherwise, must contend with a shrinking market share. One aspect of such technology is a graphical user interface (GUI) that presents content describing and/or depicting goods/services for acquisition through an e-commerce solution. Another aspect of such technology is a component that predicts which goods/services match a consumer's interests. Improving these aspects may involve connecting the content presented in the GUI with the component's prediction, for example, by making the GUI's content easier to find in a natural language search directed towards the goods/services depicted by that GUI. There is a consistent need for such improvements.

It is with respect to these and other considerations that the present improvements have been desired.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to leverage machine learning for search engine optimization (SEO). Some embodiments are particularly directed to techniques to leverage machine learning for SEO by selecting an accurate set of descriptive words to update an online platform. In one embodiment, for example, an apparatus may include a processing circuit and logic stored in computer memory and executed on the processing circuit. The logic may be operative to cause the processing circuit to store platform search data comprising selections of items and associated search terms as datasets of mapping information. Each dataset includes a word or word combination corresponding to a natural language search of an online platform and an item selected in association with the natural language search. The logic may be operative to further cause the processing circuit to identify, for a particular item, a set of descriptive words amongst the datasets of the platform search data based upon a machine learning model. The logic may be operative to further cause the processing circuit to update attribute data in a web document of the online platform with the set of descriptive words. The attribute data corresponds to the particular item. The logic may be operative to further cause the processing circuit to process search engine results for a public search engine search comprising the set of descriptive words to determine whether there is a change in a position for the online platform in the search engine results. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 3A illustrates an embodiment of platform search data and FIG. 3B illustrates an embodiment of an online platform for the system of FIG. 1.

DETAILED DESCRIPTION

Figure 1:
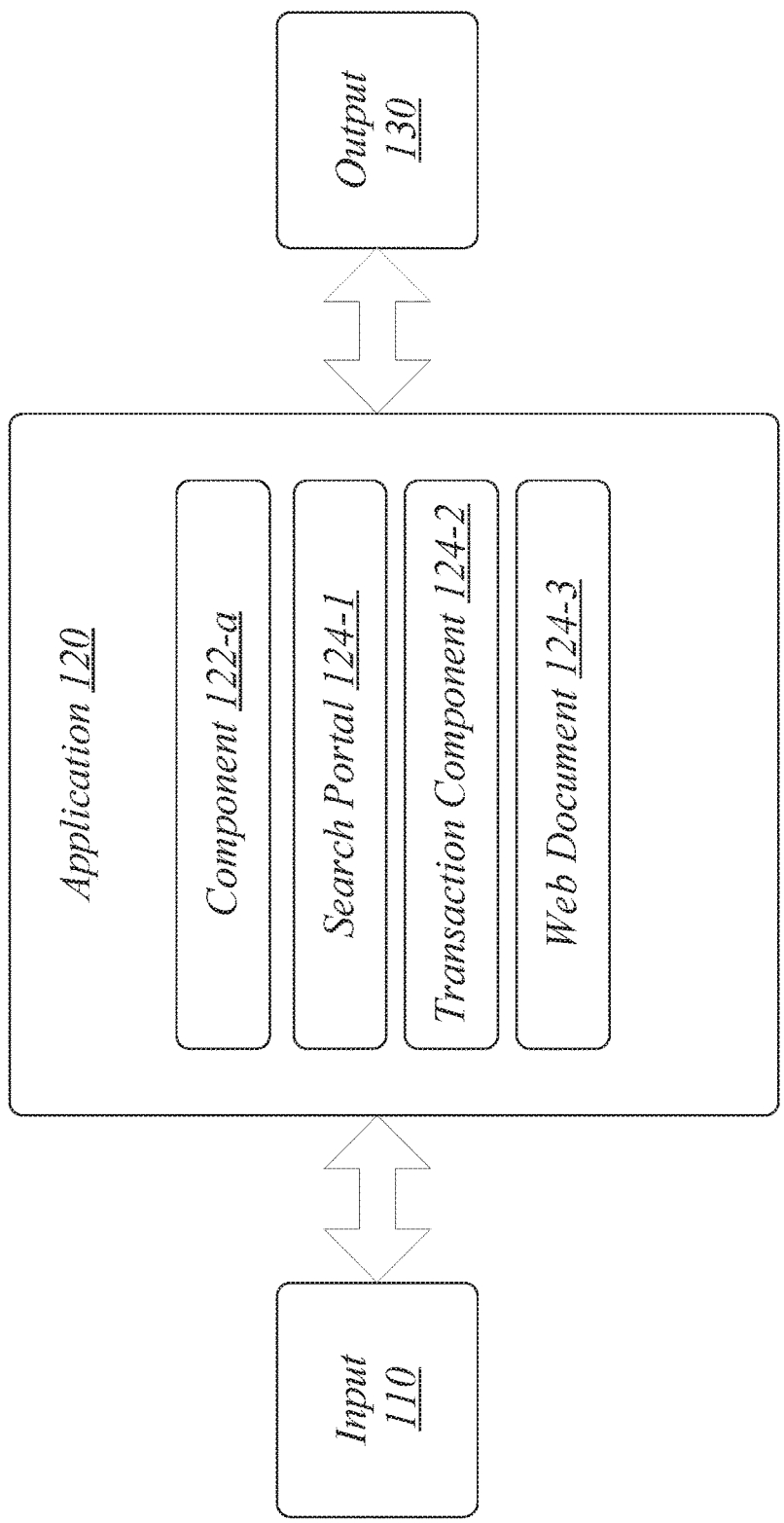
FIG. 1 illustrates an embodiment of a system to leverage machine learning for search engine optimization.

Various embodiments of the present disclosure are directed to improving an online platform with descriptive content and/or metadata in furtherance of search engine optimization (SEO). These embodiments are enhancements to SEO by way of effective word selection. While some embodiments manifest in online platforms, other Internet-based technologies may employ the techniques described herein.

A conventional online platform is a turnkey e-commerce solution for a product or product group operating on the Internet or World-Wide-Web. The conventional online platform requires a workforce for content and must rely on ineffective means to determine which words to use for that content. The selection of words is critical not only for advertising to the public but for ranking in a public search engine. Simple words or phrases may be used, but they fail to connect to an actual product being sold and may not distinguish the product being sold from other products. The conventional online platform may rely on word of mouth to determine which words to use in advertising, but such a technique may be unreliable in execution and may not reflect the mindset or methodologies of consumers. For at least these reasons, public search engines may not advantageously rank the content in the conventional online platform. Hence, the conventional online platform may be limited to a sub-optimal search result position.

As at least one distinguishing characteristic, the improved online platform of the present disclosure leverages machine learning to achieve a proper ranking. The improved online platform of the present disclosure relies upon insights gained from historical natural language searches. For example, the improved online platform may identify a search term being used to ultimately select a particular automobile. If that search term is used as a search query in a substantial number of searches, the improved online platform uses the search term in SEO. The improved online platform inserts the search term into content and/or metadata corresponding to the particular automobile and, as a result, receives an increase in traffic from Internet users.

As a result, the embodiments can improve affordability, scalability, modularity, extendibility, or interoperability for an operator, device or network.

With general reference to notations and nomenclature used herein, the detailed descriptions which follow may be presented in terms of program processes executed on a computer or network of computers. These process descriptions and representations are used by those skilled in the art to most effectively convey the substance of their work to others skilled in the art.

A process is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The processes presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates a block diagram for a system 100. In one embodiment, the system 100 may comprise a computer-implemented system having hardware components and software components. Although the system 100 shown in FIG. 1 has a limited number of elements in a certain topology, it may be appreciated that the system 100 may include more or fewer elements in alternate topologies as desired for a given implementation.

In one embodiment, the system 100 may comprise a software application 120 comprising one or more components 122-a. It is worthy to note that "a" and "b" and "c" and similar designators as used herein are intended to be variables representing any positive integer. Thus, for example, if an implementation sets a value for a=5, then a complete set of components 122-a may include components 122-1, 122-2, 122-3, 122-4 and 122-5. The embodiments are not limited in this context.

The system 100 may comprise the application 120 as a web browser application with network access to computing services associated with an online platform. The online platform may be part of an e-commerce solution for any enterprise selling products. In one example, the application 120 provides Internet access to a web server running the online platform. In another example, the application 120 may be a mobile application running on a mobile device. Through the application 120, the online platform may be operative to present content describing goods and/or services (i.e., items) for sale and handle transactions purchasing some combination of those items.

Traditional applications preexisting the application 120 provide a different e-commerce solution towards selling products. The present disclosure describes the application 120 to be an improvement upon these applications in a number of respects. To illustrate by way of example, consider the restrictions/limitations placed on traditional approaches to selling automobiles through the Internet. Traditional vehicle shopping platforms allow users to search for vehicles by make or model, making it a prerequisite that these users know which make/model they desire. Traditional vehicle shopping platforms may not implement a natural language search and require keyword searches, for instance, by make and model, engine size, or any other easily mapped names/features. Often, the user does not have a make/model in mind but would rather search by other characteristics, sentiments, and/or the like.

Machine learning models predicting the user's intent behind a search term characterizing their desired automobile(s) can be used to enhance traditional approaches to selling automobiles through the Internet. Machine learning models based upon on automobile reviews (both by experts and non-experts), specifications, and other descriptive materials have been disclosed in a co-pending U.S. patent application Ser. No. 16/254,504, filed Jan. 22, 2019, by Capital One Services, LLC, entitled "OFFERING AUTOMOBILE RECOMMENDATIONS FROM GENERIC FEATURES LEARNED FROM NATURAL LANGUAGE INPUTS" and subject to assignment to a same assignee as the present disclosure. The disclosure of the above-mentioned co-pending US application is hereby incorporated by reference.

The present disclosure provides embodiments improving upon the above-mentioned traditional approaches and machine learning models. Machine learning models in accordance with the present disclosure may focus on historical natural language searches for feature probabilities/values. This is an enhancement to the above-mentioned machine learning models which utilize a variety of data sources; the machine learning models described herein utilize actual search terms and disregard the statistical noise associated with other sources. Some machine learning models of the present disclosure may be built from the above-mentioned machine learning models based upon expert and consumer reviews. While not necessary, the above-mentioned models may be used to generate an initial iteration of mapping information between sets of words and automobiles. Over time, some machine learning models of the present disclosure fine-tune/enhance such mapping information with information regarding historical natural language searches.

It is appreciated that other machine learning models of the present disclosure replace the above-mentioned machine learning models and do not rely upon their mapping information. It is possible that some expert reviews may not reflect actual consumer sentiment or may not accurately reflect relative weightings; for instance, many vehicles may be described as rugged by experts, but consumers may gravitate toward some as being more rugged than others. The present disclosure allows the system 100 to fine-tune the mappings for the online platform based on actual user searches and selections, and then, use these fine-tuned mappings to enhance SEO.

When the user accesses the online platform's web server, the application 120 operates with that web server to run the online platform's solution. The web server may provide web documents having markup language data with scripted code. The markup language data may also invoke functionality on the web server through application programming interface (API) function calls. By processing the web documents, the application 120 may be generally arranged to process input 110 and generate output 130 while displaying a Graphical User Interface (GUI) and coordinating with the online platform's web server.

The online platform may provide various components for operating the GUI, including a search portal 124-1 generally arranged to operate at least one search mechanism for the online platform. The search portal 124-1 may be generally arranged to process search queries as input and respond with search results as output comprising a set of relevant items. The GUI elements of the search portal 124-1 facilitate searches (e.g., natural language searches) of the online platform; in some embodiments, these GUI elements include an input field into which a user enters a word or a word combination when requesting a natural language search of the items. The application 120 may comprise a transaction component 124-2 generally arranged to facilitate execution of electronic transactions (e.g., purchases) with the online platform.

An example natural language search of a word or word combination is invoked by the search portal 124-1 when the word or word combination is submitted as input. For instance, the search portal 124-1 and the application 120—using scripted code (e.g., JavaScript) embedded in markup language data (e.g., HTML)—may generate a grid to lay out a menu of items corresponding to the submitted word or word combination; within such a grid, each grid position corresponds to a particular menu item and includes an image and text for that particular menu item. Selecting a grid position effectively selects the corresponding particular menu item for an electronic transaction via the transaction component 124-2, according to at least one embodiment. It is appreciated that the electronic device running the application 120 includes Natural User Interface (NUI) technology for processing user input via gesture and/or speech. Therefore, in addition to tactile input, the user can select the particular item for purchase using speech and/or gesture input.

It is further appreciated that the above-mentioned natural language search and subsequent user selection infers a relationship between the menu of items (especially the particular item selected by the user) and the word or word combination submitted for that search. The selection of the particular item at least implies a degree of relevance with a semantic meaning of the word or word combination. Hence, the word or word combination has some accuracy in its description of the particular item. The system 100 leverages that accuracy to improve the online platform's functionality; for example, the system 100 may use the word or word combination to improve the particular item's ranking against other items.

There are number of explicit ways the user could 'select' a particular automobile make/model or a generic automobile category (e.g., an automobile body type). This can include choosing filter terms alongside a natural language search and clicking through, bookmarking, or "'like'ing" specific automobiles. As an example, the user entering the search term "kid-friendly" led to clicking on/searching for a specific automobile make/model (e.g., a specific minivan), "minivan," and "third row seat." When training a machine learning model on this data, it learns to assign a probability between the search term "kid-friendly" and a specific automobile make/model, a generic automobile body type, and/or a generic automobile feature.

A web document 124-3 may include markup language data and/or scripted code configured to present information corresponding to the particular item for purchase on the online platform. As an alternative, the web document 124-3 may present the above-mentioned menu of items. The present disclosure describes example techniques to improve the web document 124-3's position among public search engine search results; one example technique updates attribute data of the web document 124-3 by inserting the word or word combination that best describes the particular item. Typically, the web document 124-3 would appear lower than expert/customer reviews amongst search engine results; however, when the web document 124-3 is updated with descriptive sets of words, the search engine result position may appear higher than such reviews. These word(s) could be selected using machine learning models based upon a variety of data sources and/or fine-tuned based on associations learned from the online platform searches and subsequent selections. These word(s) may then be used to improve upon proprietary natural language searches by the online platform.

In operation, the system 100 updates (e.g., in near real-time) the web document 124-3 via an SEO technique configured to improve the web document 124-3's position among public search engine search results. The attribute data of the markup language data and/or scripted code specifies the content and metadata generated for the particular item and crawled by public search engine; therefore, modifying the attribute data to include descriptive words for the particular item improves the web document 124-3's search engine result position and increases traffic to the online platform.

Figure 2:
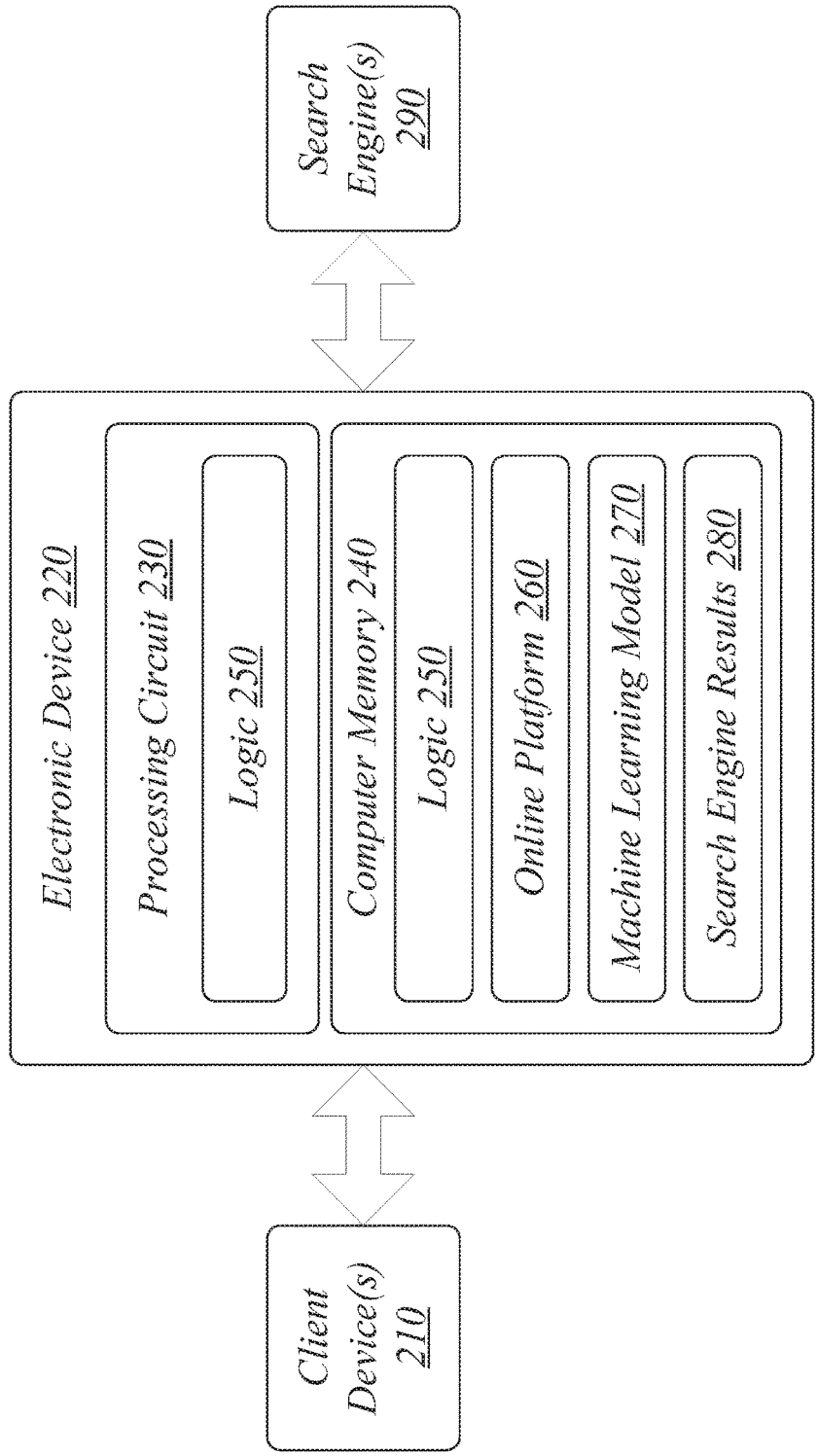
FIG. 2 illustrates an embodiment of an apparatus for the system of FIG. 1.

FIG. 2 illustrates a block diagram for an apparatus 200 for the system 100. The system 100 may configure the apparatus 200 to operate as a server computer system for an online platform of a turnkey e-commerce solution. To that end, the apparatus 200 is generally arranged to serve web documents to applications (e.g., the application 120 of FIG. 1) running in client devices 210.

In one embodiment, the apparatus 200 may include a processing circuit 230 and computer memory 240. The apparatus 200 includes logic 250 that, when stored in the computer memory 240 and executed by the processing circuit 230, is operative to leverage patterns/relationships learned from historical natural language searches to improve an online platform 260, specifically via SEO. The online platform 260, as described herein, may represent a collection of web documents written in a markup language that is compatible with various Internet or web technologies. These web documents instruct a web browser application on presenting content for the online platform 260.

In particular, the logic 250 is operative to improve public search engine rankings for web documents presenting content corresponding to various items on sale through the online platform 260. In some embodiments, the logic 250 is executed on the processing circuit 230 to store platform search data comprising selections of items and associated search terms as datasets of mapping information. Each dataset includes a word or word combination corresponding to a natural language search of an online platform, and an item selected in association with the natural language search. The logic 250 is executed on the processing circuit 230 to identify, for a particular item, a set of descriptive words amongst the datasets of the platform search data based upon a machine learning model 270.

The logic 250 is executed on the processing circuit 230 to update attribute data in a web document of the online platform with the set of descriptive words. The attribute data corresponds to the particular item, and the web document comprises a selectable option for the particular item. The attribute data specifies content, metadata, or both content and metadata for the web document; therefore, modifying any of the attribute data changes the content, metadata, or both content and metadata for the web document. In some embodiments, the attribute data refers to a TITLE attribute.

The logic 250 is executed on the processing circuit 230 to process search engine results 280 for a public search engine search comprising the set of descriptive words to determine whether there is a change in a position for the online platform in the search engine results. The logic 250 may run natural language searches on one or more public search engines 290 to obtain the search engine results 280. It is appreciated that the search engine results may be used to determine the effectiveness of the updated attribute data and train the machine learning model accordingly. In some embodiments, the logic 250 is operative to further update the web document in the online platform, for example, by replacing other text with the set of descriptive words and/or inserting additional text from another set of descriptive words. The machine learning model 270 may identify the other set of descriptive words as having a next highest likelihood of being relevant to the particular item.

The logic 250 may build and train the machine learning model 270 to determine which word(s) to use in the content (or in metadata for the content). It is appreciated that a number of implementations may be employed for the machine learning model 270. In some embodiments, the machine learning model 270 may include, for each item in the online platform 260, a word-frequency table pairing a particular word or word combination with a frequency ratio or probability. The frequency ratio or probability may refer to the historical natural language searches and/or another data source (e.g., expert and consumer reviews). In some embodiments, the machine learning model 270 includes a polynomial function ($y=f(x)$) or a probability distribution ($p(y|x)$) that processes, as input x, a number of features in a feature set and determines, as output y, a prediction as to which word or word combination accurately describes a particular item/generic item category and is most relevant to a natural language search involving the word or word combination. When selecting the word or word combination to update the online platform 260, the logic 250 may select the word or word combination having a highest value for y when compared to other sets of words in the machine learning model 270. An example word or word combination for selection may have a highest probability of being selected (e.g., through later filtering, bookmarks, starring, and/or the like) by users if entered as a natural language search. It is appreciated that, in addition to the word or word combination, the machine learning model 270 may use, as a feature, any quantifiable variable. For instance, a part of speech of the word or word combination may be feature.

An example implementation of the machine learning model 270 includes a statistical model that when given a word or word combination as input x, provides a probability $p(y|x)$ of an item or a set of items being relevant to the given set of words. In some embodiments, the machine learning model 270 may be configured as a naïve Bayes classifier or another probabilistic model. As an alternative, the machine learning model 270 includes a mathematical function that when given a word or word combination as input x, provides a value ($f(x)$) indicating to what degree that word or word combination is relevant to an item or a set of items in the online platform 260. The item or the set of items may be returned as a search result if the word or word combination were used to execute a search query. In the context of online automobile searching/shopping, the machine learning model 270 may indicate a generic automobile category that correlates to a word or word combination and if that correlation is significant (e.g., exceeds a predefined threshold probability), the word or word combination constitutes a descriptive set of words for the generic automobile category.

In one or more embodiments, the machine learning model 270 is trained to associate generic language with language related to automobile features, automobile (body) types, and/or specific automobile makes and models. In one or more embodiments, the machine learning model 270 and associated components can output a probability distribution that a particular word or word combination is associated with a particular automobile feature, automobile type, and/or automobile make and model, e.g., the likelihood that the automobile feature, automobile type, and/or automobile make and model is a preferred automobile feature, automobile type, and/or automobile make and model of the user submitting the particular word or word combination in a natural language search.

It is further appreciated that the machine learning model 270 may form an automobile-centric lexicon where certain sets of words describe a particular automobile or an automobile category, such that the machine learning model 270 is configured to identify a mapping between a descriptive set of words and either a specific item (e.g., automobile) or a generic item category (e.g., generic automobile category). After training, the logic 250 may use the machine learning model 270 to return a rank-ordered list of relevant make/models (as output) in response to a word or word combination (as input). This set of words can include specific or generic features related to automobiles, including any of the following examples: "lane keep assist"; "adaptive cruise control"; "family car," "smooth handling"; and "high maintenance." The machine learning model 270 is connecting the semantic associations of natural language searches with those of particular automobiles.

FIG. 3A illustrates an embodiment of platform search data 300 for the system 100. In particular, the platform search data 300 includes mapping information between descriptive words/word combinations and generic automobile categories, which are illustrated by FIG. 3A as including a Compact Car, a Minivan, a Full-Size Pickup, and a Full-Size Car. It is appreciated that other generic automobiles categories can be configured for the platform search data 300.

The system 100 may use the platform search data 300 to build a machine learning model configured to predict which automobile categories (or specific automobiles) match a word or word combination. As described herein, some embodiments of the machine learning model identify relevant automobiles to return as search results in response to a natural language search. Previous natural language searches indicate various relationships/patterns between certain words/word combinations and automobile selections of which the system 100 represents as a mathematical function or a probability distribution, forming a basis for the above-mentioned machine learning model. Hence, using data from the previous natural language searches, the system 100 can train the machine learning model to determine an intended meaning underlying a user's current natural language search. In a context of the generic automobile categories (versus specific automobiles), the machine learning model operates as an automobile-centric lexicon.

Figure 3B:
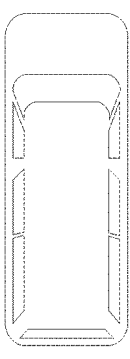

FIG. 3B illustrates an embodiment of an online platform 350 for the system 100. As shown in FIG. 3B, the online platform 350 includes a menu 360 with menu items of a which an example menu item $362x$ includes an image 364, textual data 366, and a link 368. Attribute data for the image 364, the textual data 366, and the link 368 determine content (e.g., HTML body tag) and/or metadata (e.g., HTML meta tag) for the example menu item $362x$. The attribute data for the image 364 determines which image file to render and display as well what text to use as metadata. The attribute data for the image 364 may also determine a label tag having text to display when activated (e.g., by a pointer device). The attribute data for the textual data 366 determines what text to display in the example menu item $362i$'s portion of the menu 360. The attribute data for the link 368 determines which resource locator to use as a hyperlink as well as what text to display when activated (e.g., via the pointer device).

The online platform 350 of FIG. 3B refers to a graphical representation (i.e., a GUI) of one or more web documents having markup language data and (possibly) computer program code (e.g., scripted code). Processing a web document's markup language data generates elements (e.g., GUI elements) forming an appearance/layout of the online platform 350. Some elements include menu item $362_1$, menu item $362_2$, and menu item 3623; similar to the example menu item $362x$, each of these menu items includes an image, textual data, and a link to more information and/or to purchase.

In FIG. 3B, menu item $362_1$, menu item $362_2$, and menu item 3623 refer to specific automobiles for sale. These menu items may correspond to a natural language search or a keyword search. The menu item $362_1$, for instance, may be a top search result for "tech-ready family-friendly minivan" or some similar phrasing. As described herein, the system 100 may determine the top search result using a machine learning model, such as the above-mentioned machine learning model built from the platform search data 300. The system 100 increases traction and sales to the menu item $362_1$ and a corresponding automobile, respectively, by influencing public search engines through SEO and improving a search result position for a portion of the online platform 350 corresponding to the menu item $362_1$. For that menu item, the online platform 350 has a resource locator, which may be a Universal Resource Locator (URL), as a unique identifier in the Internet. The resource locator allows another computer to access the online platform 350 and then, process information associated with the menu item, such as the information in content presented for the menu item $362_1$.

As described herein, the system 100 increases the search result position for the resource locator directing computing devices to the menu item $362_1$. In some embodiments, the system 100 improves a reputation and popularity for that specific resource locator. Drawing more Internet traffic may involve matching more natural language searches submitted through public search engines. With respect to the menu item $362_1$, improving a reputation and popularity for that menu item's resource locator involves updating the content for the menu item $362_1$ to be more relevant to the corresponding automobile. One example embodiment for updating the content include adding descriptive words that appropriately characterize that specific automobile. This can be accomplished by updating attribute data for the menu item $362_1$, such as an HTML ALT attribute, such that either metadata or data in the online platform 350 includes descriptive words for the specific automobile.

In one embodiment, the system 100 updates the above-mentioned attribute data by automatically identifying which word or word combination describes the corresponding automobile in the menu item $362_1$ and is to be included in the online platform 350. This word or word combination is likely to be spoken or written by users, for example, in a natural language search submitted to a public search engine or any search engine. Once identified, the system 100 updates the attribute data for a portion of the menu 360 whose content describes the corresponding automobile such that the content, the metadata of the content, or both now include the identified word or word combination. By doing so, the system 100 influences the public search engine to adjust an index ranking between the identified word or word combination and the menu item $362_1$. This adjustment, in turn, causes the public search engine to consider the online platform 350 (and, specifically, the above-mentioned portion of the menu 360) when determining search engine results for a natural language search directed (at least in part) to the identified word or word combination. After sufficient adjustment to the index ranking, the public search engine increases the search result position for the resource locator to the menu item $362_1$ when responding to natural language searches involving the corresponding automobile. It is appreciated that a higher search result position translates into increased traffic to the menu item $362_1$.

There are a number of ways for the system 100 to update the attribute data for the menu item $362_1$ in the online platform 350. By way of example, the system 100 may modify attribute data for the corresponding automobile's image, such as an attribute for the image's label tag that is displayed when the image is activated by the user. This activation may be accomplished by positioning the pointer device's cursor above the corresponding automobile's image in the menu item $362_1$. FIG. 3B depicts an example image label tag for an image in the menu item $362_2$ illustrating a truck; when the pointer device's cursor overs the truck's image, the online platform 350 generates text displaying "A Real Coal-Runner!" and (possibly) other content. As another example, the system 100 may update an ALT attribute or a TITLE attribute of the corresponding automobile's image.

As another example, the system 100 may modify an attribute specifying content for the menu item $362_1$. The system 100 may insert one or more descriptive words into an HTML tag (e.g., an HTML body tag) comprising textual data for the menu item $362_1$. FIG. 3B illustrates the textual data for the menu item $362_1$ as including "Kid Friendly Ride of Future" underneath a make ("CarCompany1"), a model ("Minivan"), and a year ("2020") for the corresponding automobile with space for additional text and/or alternative text. By having "Kid Friendly" in the menu item $362_1$, it can be assumed that the public search engine would have a search result position for the menu item $362_1$. Based upon the platform search data 300, inserting "Tech-Ready" increases the menu item $362_1$'s relevance resulting in an improved search result position.

As yet another example, the system 100 may modify an attribute for a link in the menu item $362_1$. The system 100 may modify an attribute for the text displayed in the link itself as well as for a tag (e.g., for when the user hovers over the link with the pointer device). An example attribute may be a HREF attribute (i.e., anchor text or link text) or a TITLE attribute of a HTML anchor tag. The link (e.g., a hyperlink) may be for any purpose and utilize keywords in the anchor text to explain that purpose. FIG. 3B illustrates anchor text "Purchase Here" to indicate that the link facilitates a purchase of the corresponding automobile in the menu item $362_1$. Activating the link (e.g., by selecting with the pointer device) connects the user to a payment or financing mechanism.

It is appreciated that the system 100 may identify alternative phrasings for the identified word or word combination. "Kid-Friendly" is used to describe the Minivan in the menu item $362_1$ but the system 100 may use different words to convey a same or similar meaning. Instead of having "Kid-Friendly" as text in the menu item $362_1$, the system 100 may insert "Family-Friendly" into the menu item $362_1$. In another alternative embodiment, the system 100 may use a different word or word combination than either "Kid-Friendly" or "Family-Friendly" to convey the same or similar meaning, such as "Soccer Mom Vehicle." In some embodiments, the system 100 may implement a machine learning model that groups together sets of words based upon similarities in their semantics and then, treats each group as a single dataset combining individual probabilities. Various data sources may be used to determine whether two sets of words share semantic properties. Expert reviews and specifications may be used to identify and associated similar phrasings.

Figure 4:
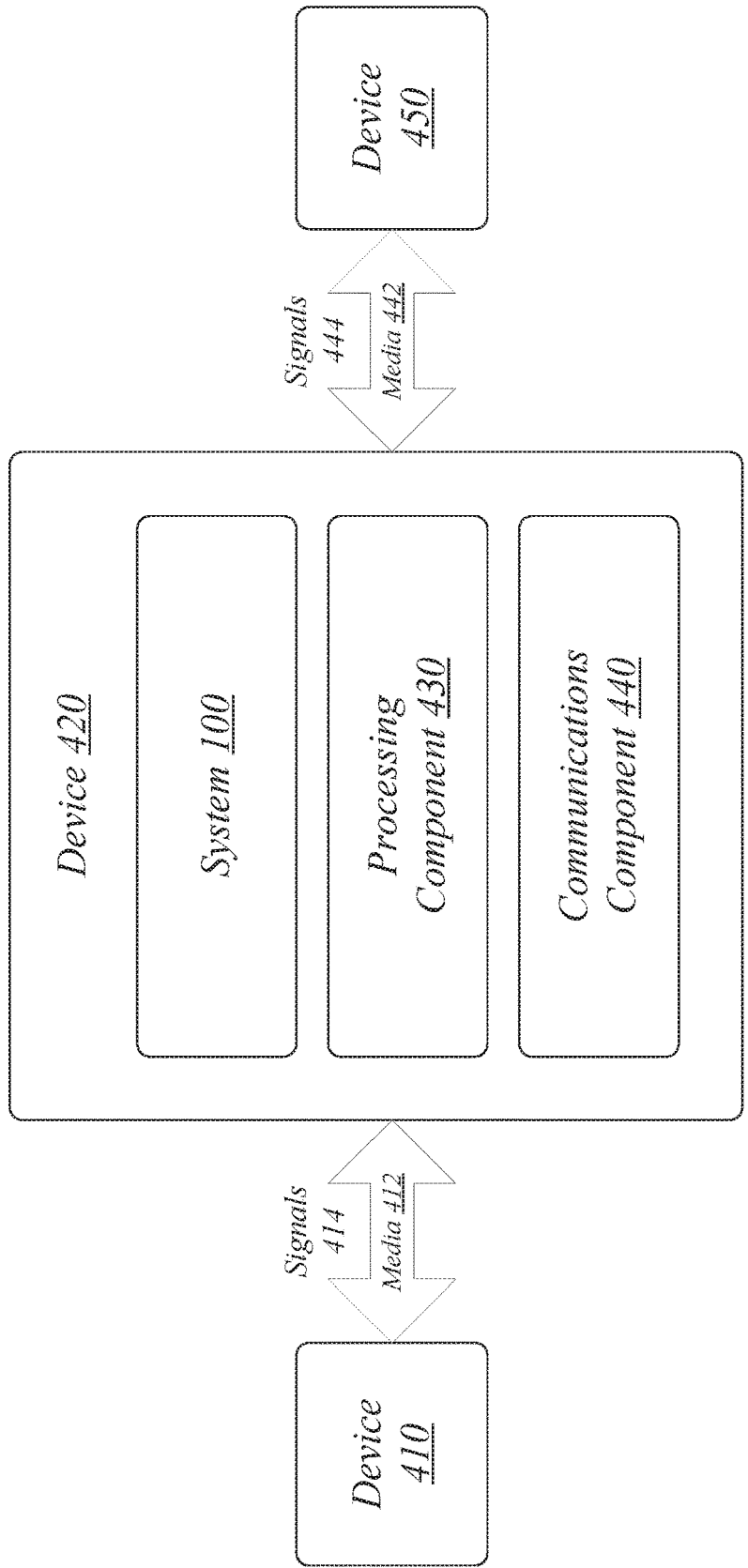
FIG. 4 illustrates an embodiment of a centralized system for the system of FIG. 1.

FIG. 4 illustrates a block diagram of a centralized system 400. The centralized system 400 may implement some or all of the structure and/or operations for the system 100 in a single computing entity, such as entirely within a single device 420. The device 420 may be a representative embodiment of the electronic device 220 of FIG. 2.

The device 420 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 420 may execute processing operations or logic for the system 100 using a processing component 430. The processing component 430 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), Application-specific Standard Products (ASSPs), System-on-a-chip systems (SOCs), Complex Programmable Logic Devices (CPLDs), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, processes, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 420 may execute communications operations or logic for the system 100 using communications component 440. The communications component 440 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 440 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 412, 442 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 420 may communicate with other devices 410, 450 over a communications media 412, 442, respectively, using communications signals 414, 444, respectively, via the communications component 440. The devices 410, 450 may be internal or external to the device 420 as desired for a given implementation.

Included herein is a set of flow charts representative of exemplary methodologies for performing exemplary aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
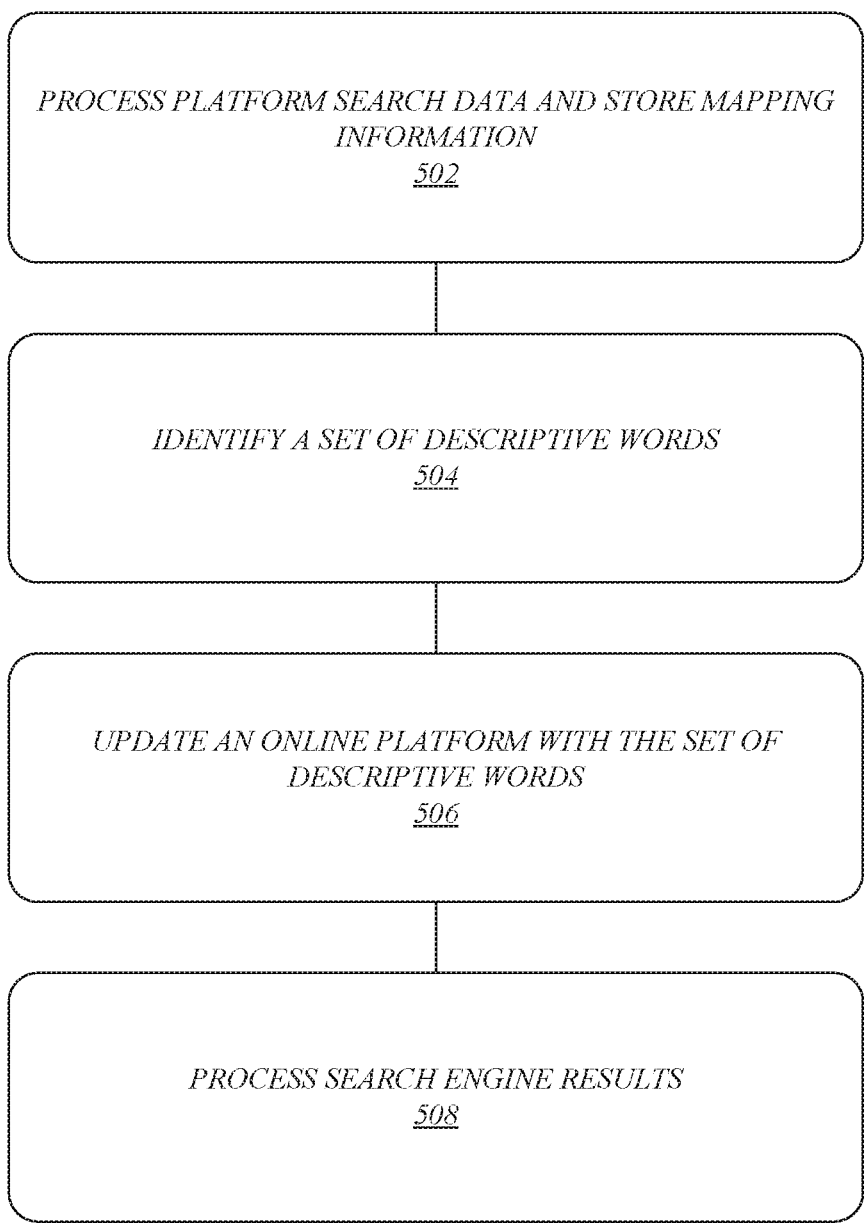
FIG. 5 illustrates an embodiment of a logic flow for the system of FIG. 1.

FIG. 5 illustrates one embodiment of a logic flow 500. The logic flow 500 may be representative of some or all of the operations executed by one or more embodiments described herein.

In the illustrated embodiment shown in FIG. 5, the logic flow 500 processes platform search data and stores mapping information at block 502. For example, the logic flow 500 may record datasets corresponding to historical natural language searches of an online platform of which each dataset includes a word or word combination being used as a search term and one or more items (e.g., automobiles) for sale through the online platform. It is appreciated that the one or more automobiles may form a set of automobiles associated with a generic automobile category (e.g., a minivan, a truck, a compact car, and/or the like).

The logic flow 500 may identify a set of descriptive words for a particular automobile based upon the platform search data at block 504. For example, the logic flow 500 may select a word or word combination from the platform search data to use as the set of descriptive words. The logic flow 500 may utilize a machine learning model comprising a function or a probability distribution to select the word or word combination having a highest function value or probability for the particular automobile. To predict which word or word combination to select, both the function and the probability distribution rely upon a set of features of which the mapping information in the platform search data includes at least one example feature. The set of features may be restricted to actual search terms being used in natural language searches (either in public search engines or propriety search engines), providing increased accuracy over traditional approaches to applying machine learning in an e-commerce solution.

The logic flow 500 may update the online platform with the set of descriptive words at block 506. By doing so, the logic flow 500 may cause an increase to a search engine result position for online platform web documents describing/depicting the particular automobile. This is an improvement over traditional approaches where the best and most descriptive words to use (e.g., in SEO) are not easily known. For example, based upon SEO principles, the logic flow 500 modifies certain attribute data for one or more web documents of the online platform in an effort to improve upon search engine result positions for the one or more web documents. As a result, the modified attribute data changes specific content, metadata, or both metadata and content in the online platform. In one embodiment, the logic flow 500 modifies one or more attributes of a web document having content and/or metadata corresponding to the above-mentioned particular automobile. A public search crawler focuses resources on processing such attribute data when creating and then, maintaining an index; at least for that reason, the public search engine increases a search engine result position for the web document. This is true for natural language searches of the set of descriptive words and may be true for searches of other words describing the particular automobile. The web document's search engine result position increases for searches of the particular automobile itself. As another example, the web document's search engine result position increases for natural language searches for alternative phrases of the set of descriptive words.

The logic flow 500 may process search results at block 508. For example, the logic flow 500 may run sample natural language searches on the public search engines. This may be accomplished by sending requests to an application programming interface (API) of the public search engine; it is appreciated that those skilled in the art may utilize a different technique for running searches against the public search engine. In any case, the public search engine provides search engine results amongst which is the above-mentioned web document. The logic flow 500 may determine an actual change in the search engine result position at some point-in-time after updating the above-mentioned web document for the public search engine crawler to index. The embodiments are not limited to this example.

Figure 6:
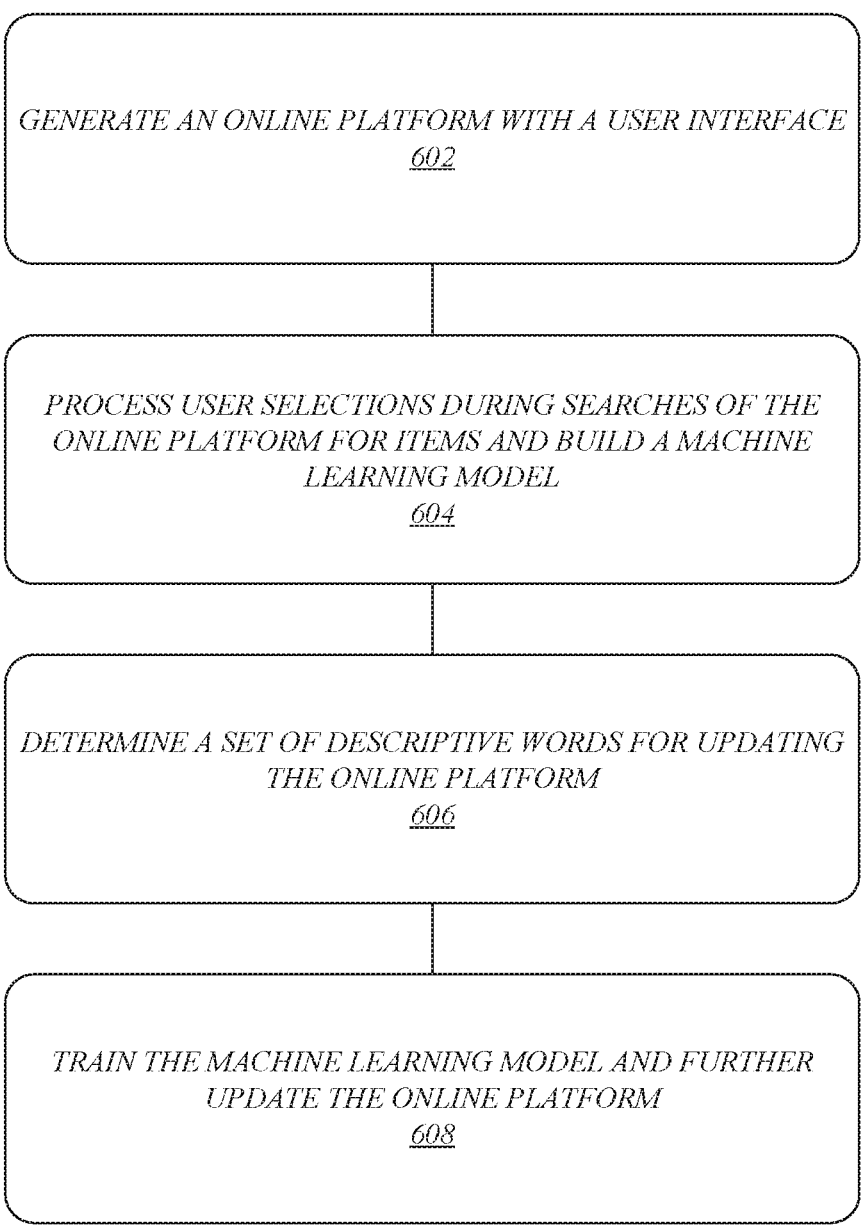
FIG. 6 illustrates an embodiment of a logic flow for the system of FIG. 1.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 generate an online platform with a user interface (UI) at block 602. For example, the logic flow 600 may generate the UI with various content describing items for purchase.

The logic flow 600 may process user selections during searches of the online platform for items and build a machine learning model from such mapping information at block 604. For example, the online platform may implement a search mechanism in the form of a chatbot configured to engage in a natural language conversation with a customer. A search portal is another example search mechanism employed by the online platform. Either search mechanism may assist the customer in searching a collection of items for at least one item to purchase.

Such searching may form part of a building/training process for a machine learning model (e.g., the machine learning model 270 of FIG. 2). As described herein, the customer's queries and subsequent selections can be used to identify relevant items for specific queries. Moreover, the customer's selections-which may be referred to herein as user selections—may be used to build the machine learning model into an accurate mechanism for determining whether a specific item is relevant to a given search query's search term(s). In some embodiments, the machine learning model may be a neural network or a statistical model that when given a search query, classifies the collection of items according to relevance. With a set of words comprising the search query as input to the search mechanism, the machine learning model (e.g., via a heuristic function) may produce, for each item, a relevance value; and if that relevance value exceeds a threshold, the corresponding item is identified as relevant to that customer's search query.

In an example exchange, the customer may enter a natural language search query comprising search terms in the phrase "rough and tough" to which the chatbot may respond with a sorted list of automobile choices. When the user makes a selection, the chatbot creates log data (e.g., in the platform search data 300 of FIG. 3) indicating the natural language search query word or word combination and the selected automobile. In some embodiments, the chatbot displays the sorted list of generic automobile choices (e.g., generic makes and/or models). The generic automobile choices, for instance, may include a generic jeep, a generic sedan, a generic minivan, a generic pickup truck, and/or the like. The customer's choice of generic automobile indicates a relevancy relationship between the customer's query of "rough and tough" and, in some embodiments, a frequency of that user selection (over time) is an example feature indicating relevance. To illustrate by way of example, it may be the case that the customer intends to purchase a powerful automobile when that customer submitted "rough and tough" into the chatbot and (accordingly) there should be more selections of the generic pickup truck than selections of a generic sedan or a generic station wagon. Hence, for the phase "rough and tough", presenting a list of sedans of various makes and models will result in fewer selections/purchases than a list of pickup trucks.

In turn, the logic flow 600 adjusts the above-mentioned machine learning model, specifically, to decrease a frequency or ratio between the phrase "rough and tough" and selections of a generic sedan or a generic station wagon. It is appreciated that there may not be a frequency or ratio value, reflecting a lack of a relevance between the phrase "rough and tough" and the selections of a generic sedan or a generic station wagon. The logic flow 600 may adjust the machine learning model to increase a frequency or ratio between the phrase "rough and tough" and selections of a generic pickup truck, for example, in response a considerable number of historical natural language searches ultimately concluding in a selection of a specific pickup truck.

While it is possible for a sedan to be described with the phrase "rough and tough" such as in a car review, the logic flow 600 should not configure the machine learning model to somehow account for that description. The machine learning model should disavow that association in the frequency or ratio between the phrase "rough and tough" and selections of a generic sedan.

In some embodiments, the customer may be searching for rough and tough sedans; for example, after selecting pre-filter for sedans, the customer may enter a natural language search for "rough and tough" within only sedans. The machine learning model may implement tiered word associations such that a set of words has a different probability distribution for each tier. There may be a primary word association and a secondary word association; if the customer is searching for "rough and tough" without any pre-filters, maybe only those automobiles with the primary association show up in the top results, whereas secondary word associations may exist with other characteristics (e.g., rough and tough commuter) that would search within secondary associations.

As described herein, if the frequency or ratio regarding selections of a generic pickup truck exceeds a threshold and/or is statistically significant, the phrase "rough and tough" reliably relates to pickup trucks in general. The chatbot may respond with a list of specific pickup truck makes/models, and the customer most likely will find those search results relevant to their search query. In some embodiments, the system 100 refines the machine learning model in response to a user selection of a specific pickup truck from the list of specific pickup trucks, for example, by increasing a relevance score between a set of words comprising "rough and tough" and the specific pickup truck.

The logic flow 600 may determine a set of descriptive words for updating the online platform at block 606. In one embodiment, for the machine learning model, the logic flow 600 generates a deterministic technique to quantify a degree at which the word or word combination describes the item of the online platform. For example, the logic flow 600 builds the machine learning model using, as input, feature information extracted from the above-mentioned mapping information and any other platform search data. From such feature information, the logic flow 600 determines parameters for the deterministic technique configured to compute, as output, a measurement regarding relevance between a word or word combination and an item of the online platform. Accordingly, these measurements form a mathematical distribution (e.g., a polynomial distribution, a probability distribution, and/or the like) and can be characterized as relevance scores or values where higher values indicate a greater degree of relevance and lower values indicate a smaller degree of relevance.

As described herein, the logic flow 600 may identify an automobile as an item whose sales need improvement. The logic flow 600 may use the machine learning model to select the set of descriptive words having a highest likelihood of causing a positive change in a search engine result position for a web document corresponding to the automobile. Public search engines use a mechanism to rank, in an index, web documents including relevant web documents corresponding to the above-mentioned automobile; an example index may rank such web documents according to content and/or metadata. Based upon the word or word combination submitted in a natural language search, the public search engines use the index to identify matching web documents as a response to that search. By updating attribute data of the web document with the set of descriptive words, the logic flow 600 may increase a probability of that web document matching the search query submitted in the natural language search.

In another embodiment, the logic flow 600 may use the machine learning model to determine that the set of descriptive words (or another word or word combination) include an undervalued advertisement for the public search engine. In addition to search results, the public search engine provides advertisements that have been purchased for certain search terms. In general, if the machine learning model indicates a relationship between a given word or word combination and a specific automobile or a generic automobile category, that given word or word combination may be undervalued by the public search engine. If the public search engine's cost for the set of descriptive words falls below some threshold, the logic flow 600 may purchase advertisement space for promoting the above-mentioned automobile in natural language searches including the set of descriptive words.

The logic flow 600 may train the machine learning model and further update the online platform at block 608. For example, after updating the web document as accomplished in block 606, the logic flow 600 may determine an increase in traffic to the online platform and in view of that increase, tune parameters of the machine learning model. The logic flow 600 may employ addition SEO techniques to further update the online platform including the attribute data of the above-mentioned web document. The logic flow 600 may continuously update the online platform and measure changes in search engine result position over time. The logic flow 600 may update other attribute data of the web document with the set of descriptive words, increasing a frequency of the set of descriptive words in the online platform.

As an alternative, the logic flow 600 may decrease a frequency of the set of descriptive words in the online platform by removing the set of descriptive words from some of the attribute data in the web document.

The logic flow 600 may, after repeating block 606 for a plurality of automobiles, measure an average gain in Internet traffic from updating the online platform with a word or word combination having a highest value in terms of describing either a specific automobile, a generic automobile group, or both a specific automobile and a generic automobile group. The logic flow 600 may use the average gain to determine whether to increase or decrease a frequency of the set of descriptive words in the web document. The logic flow 600 may rely on the average gain to determine whether to use multiple sets of descriptive words to update the web document. In another embodiment, the logic flow 600 may use the average gain to determine whether to purchase some of the public search engine's advertisement space to promote the automobile in natural language searches including the set of descriptive words. The machine learning model may correlate the average gain to a threshold value for evaluating search advertisement costs by the public search engine. If the public search engine's cost for the set of descriptive words falls below that threshold, the logic flow 600 may purchase some advertisement space because the set of descriptive words is being undervalued.

In some embodiments, training and updating the machine learning model may be performed in batched operations. For example, after a set of user searches and clicks have been collected and logged, the logic flow 600 may update probabilities in the machine learning model. Given an automobile make/model or an automobile body type (e.g., minivan), the logic flow 600 may identify at least one set of words to use for search engine optimization. The logic flow 600 may identify a word or word combination corresponding to the given automobile make/model or automobile body type whose probability is above a certain threshold or is amongst top N search terms. The logic flow 600 may use the machine learning model to determine which attribute data to update with the identified word or word combination. The embodiments are not limited to this example.

Figure 7:
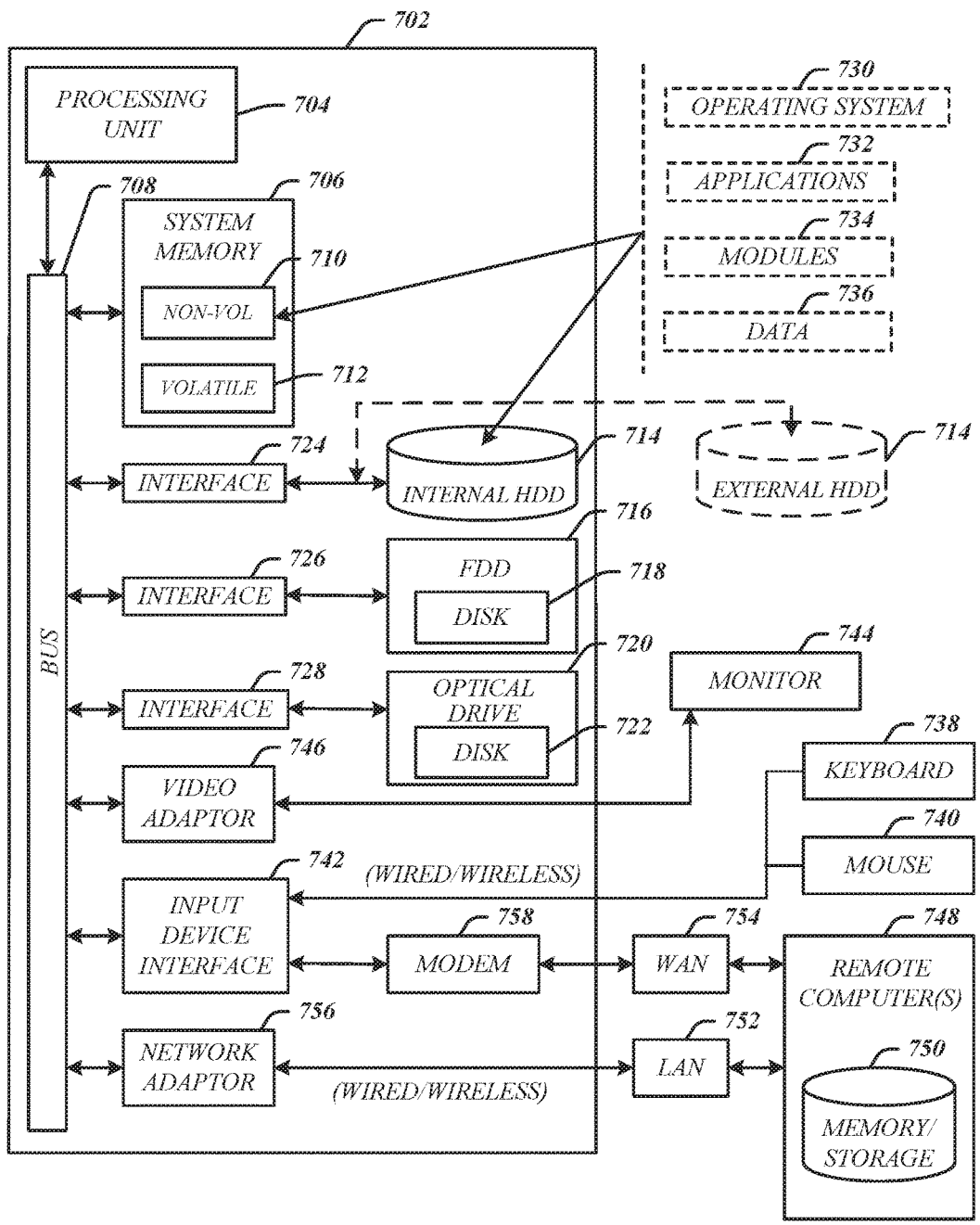
FIG. 7 illustrates an embodiment of a computing architecture.

FIG. 7 illustrates an embodiment of an exemplary computing architecture 700 suitable for implementing various embodiments as previously described. In one embodiment, the computing architecture 700 may comprise or be implemented as part of an electronic device. Examples of an electronic device may include those described with reference to FIG. 4, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 704.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
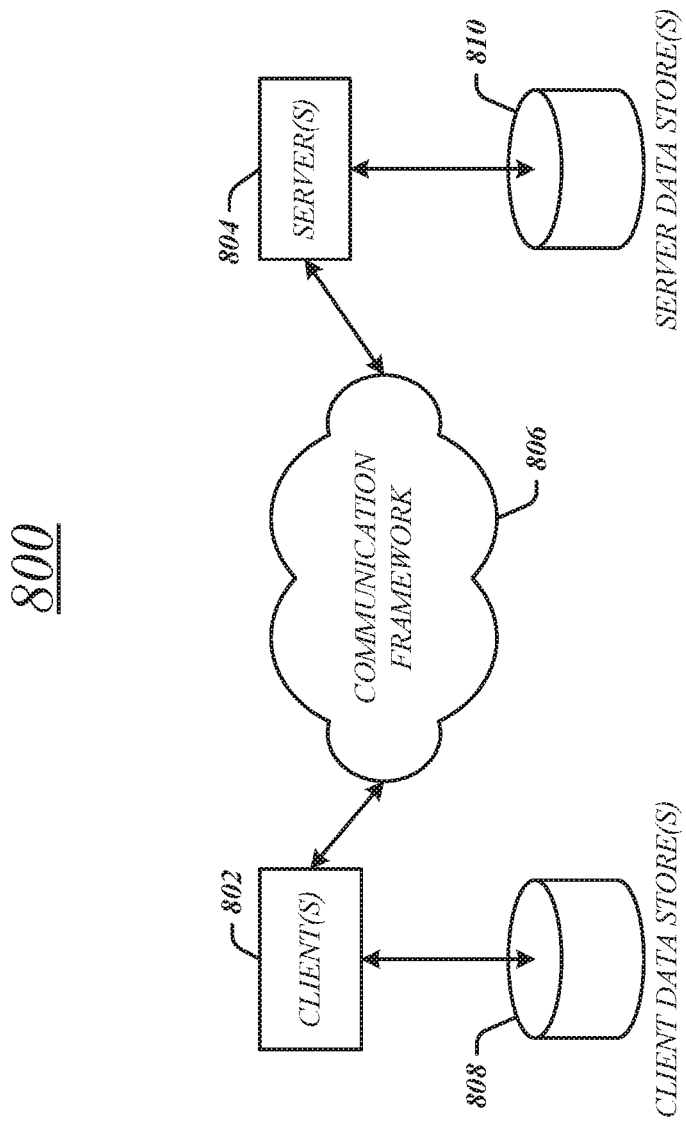
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 comprises includes one or more clients 802 and servers 804. The clients 802 may implement the client device 210. The servers 804 may implement the electronic device 220. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques and protocols. The communications framework 806 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 806 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
   a processing circuit; and
   logic stored in computer memory and executed on the processing circuit, the logic operative to cause the processing circuit to:
   store datasets of platform search data, each dataset comprises a word or word combination corresponding to a natural language search of an online platform and an item selected in association with the natural language search;
   build a machine learning model based upon a feature set comprising mapping information between the word or word combination and the selected item;
   identify, for a particular item associated with a particular online platform, a set of descriptive words amongst the datasets of the platform search data based upon the machine learning model;
   update attribute data in a web document of the particular online platform with the set of descriptive words, wherein the attribute data corresponds to the particular item and the web document comprises a selectable option for the particular item;
   process search engine results, for a public search engine search, comprising the set of descriptive words to determine whether there is a change in a ranked position for the particular online platform in the search engine results based on the updated attribute data in the web document; and
   update other attribute data of other items in the web document with the set of descriptive words in response to the determined change in the search engine results.

2. The apparatus of claim 1, comprising logic operative to cause the processing circuit to update the attribute data specifying content, metadata, or both the content and the metadata for the web document.

3. The apparatus of claim 1, comprising logic operative to cause the processing circuit to update an alternate text (ALT) attribute or a TITLE attribute of an image with the set of descriptive words or to update keywords for a link to the web document.

4. The apparatus of claim 1, comprising logic operative to cause the processing circuit to identify another set of descriptive words to update the web document of the particular online platform.

5. The apparatus of claim 1, comprising logic operative to cause the processing circuit to determine that the set of descriptive words comprises an undervalued advertisement for the public search engine.

6. The apparatus of claim 1, comprising logic operative to cause the processing circuit to increase or decrease a frequency of the set of descriptive words in the particular online platform.

7. The apparatus of claim 1, comprising logic operative to cause the processing circuit to identify an alternative word phrase to use instead of the set of descriptive words.

8. A computer-implemented method executed on a processing circuit, the computer-implemented method comprising:
   storing datasets of platform search data, each dataset comprises a set of words corresponding to a natural language search of an online platform, and an item selected in association with the natural language search;
   building a machine learning model based upon a feature set comprising mapping information between the set of words and the selected item;
   training the machine learning model to identify a set of descriptive words amongst the datasets of the platform search data for a particular item associated with a particular online platform;
   updating attribute data in a web document of the particular online platform with the set of descriptive words, wherein the attribute data corresponds to the particular item and the web document comprises a selectable option for the particular item; and
   processing search engine results for a public search engine search comprising the set of descriptive words to determine whether there is a change in a ranked position for the particular online platform in the search engine results based on the updated attribute data in the web document; and
   updating other attribute data of other items in the web document with the set of descriptive words in response to the determined change in the search engine results.

9. The computer-implemented method of claim 8, comprising updating an alternate text (ALT) attribute or a TITLE attribute of an image with the set of descriptive words or updating keywords for a link to the web document.

10. The computer-implemented method of claim 8, comprising identifying another set of descriptive words to update the web document of the particular online platform.

11. The computer-implemented method of claim 8, comprising determining that the set of descriptive words comprises an undervalued advertisement for the public search engine.

12. The computer-implemented method of claim 8, comprising increasing or decreasing a frequency of the set of descriptive words in the particular online platform.

13. The computer-implemented method of claim 8, comprising replacing the set of descriptive words in textual data with another set of descriptive words.

14. The computer-implemented method of claim 8, comprising identifying an alternative word phrase to use instead of the set of descriptive words.

15. At least one non-transitory computer-readable storage medium comprising instructions that, when executed, cause a system to:
   store datasets of platform search data, each dataset comprises a set of words corresponding to a natural language search of an online platform, and an item selected in association with the natural language search;
   build a machine learning model based upon a feature set comprising mapping information between the set of words and the selected item;
   train the machine learning model to identify a set of descriptive words amongst the datasets of the platform search data for a particular item associated with a particular online platform;
   update attribute data in a web document of the particular online platform with the set of descriptive words, wherein the attribute data corresponds to the particular item and the web document comprises a selectable option for the particular item;
   process search engine results for a public search engine search directed to the set of descriptive words to determine whether there is a change in an index for the particular online platform based on the updated attribute data in the web document; and
   update other attribute data of other items in the web document with the set of descriptive words in response to the determined change in the search engine results.

16. The computer-readable storage medium of claim 15, comprising instructions that when executed cause the system to update an alternate text (ALT) attribute or a TITLE attribute of an image with the set of descriptive words.

17. The computer-readable storage medium of claim 15, comprising instructions that when executed cause the system to update keywords for a link to the web document.

18. The computer-readable storage medium of claim 15, comprising instructions that when executed cause the system to, in response to the change in the index, identify another set of descriptive words to update the web document of the particular online platform.

19. The computer-readable storage medium of claim 15, comprising instructions that when executed cause the system to determine that the set of descriptive words comprises an undervalued advertisement for the public search engine.

20. The computer-readable storage medium of claim 15, comprising instructions that when executed cause the system to increase or decrease a frequency of the set of descriptive words in textual data of the particular online platform.

\* \* \* \* \*